US008083290B2

(12) United States Patent
Gillett

(10) Patent No.: US 8,083,290 B2
(45) Date of Patent: Dec. 27, 2011

(54) CAR SEAT

(75) Inventor: Michael Henry Gillett, Salem, OR (US)

(73) Assignee: Wonderland Nurserygoods Co., Ltd., Taipei (TW)

(*) Notice: Subject to any disclaimer, the term of this patent is extended or adjusted under 35 U.S.C. 154(b) by 79 days.

(21) Appl. No.: 12/490,399

(22) Filed: Jun. 24, 2009

(65) Prior Publication Data
US 2009/0322132 A1  Dec. 31, 2009

Related U.S. Application Data

(60) Provisional application No. 61/075,337, filed on Jun. 25, 2008.

(51) Int. Cl.
*A47C 1/11* (2006.01)
*A47D 1/10* (2006.01)
(52) U.S. Cl. .................. 297/256.13; 297/256.11
(58) Field of Classification Search ............. 297/256.13, 297/256.11, 256.1, 328, 216.11
See application file for complete search history.

(56) References Cited

U.S. PATENT DOCUMENTS

| | | | | |
|---|---|---|---|---|
| 4,372,611 A | * | 2/1983 | Feddeler | 297/371 |
| 4,561,621 A | * | 12/1985 | Hill | 248/397 |
| 6,139,101 A | * | 10/2000 | Berringer et al. | 297/256.1 |
| 6,428,099 B1 | | 8/2002 | Kain | |
| 6,454,350 B1 | * | 9/2002 | Celestina-Krevh et al. | 297/216.11 |
| 6,857,700 B2 | * | 2/2005 | Eastman et al. | 297/250.1 |
| 7,059,677 B2 | | 6/2006 | Balensiefer et al. | |
| 7,597,396 B2 | * | 10/2009 | Longenecker et al. | 297/253 |
| 7,625,043 B2 | * | 12/2009 | Hartenstine et al. | 297/250.1 |

* cited by examiner

*Primary Examiner* — David Dunn
*Assistant Examiner* — Tania Abraham
(74) *Attorney, Agent, or Firm* — Shook, Hardy & Bacon LLP

(57) ABSTRACT

A car seat includes a seat assembly, a base assembly disposed under and coupled pivotally to the seat assembly, a positioning mechanism including first and second positioning units, and an elongated resilient component. The first positioning unit is mounted on the base assembly and includes a plurality of first engaging members. The second positioning unit is coupled pivotally to the seat assembly, and includes a second engaging member engaging releasably a selected one of the first engaging members so as to lock releasably the base assembly at a desired angular position relative to the seat assembly. The resilient component has two ends coupled pivotally and respectively to the base assembly and the second positioning unit, and exerts a downward pulling force to the base assembly when the second engaging member is disengaged from the selected first engaging member.

14 Claims, 9 Drawing Sheets

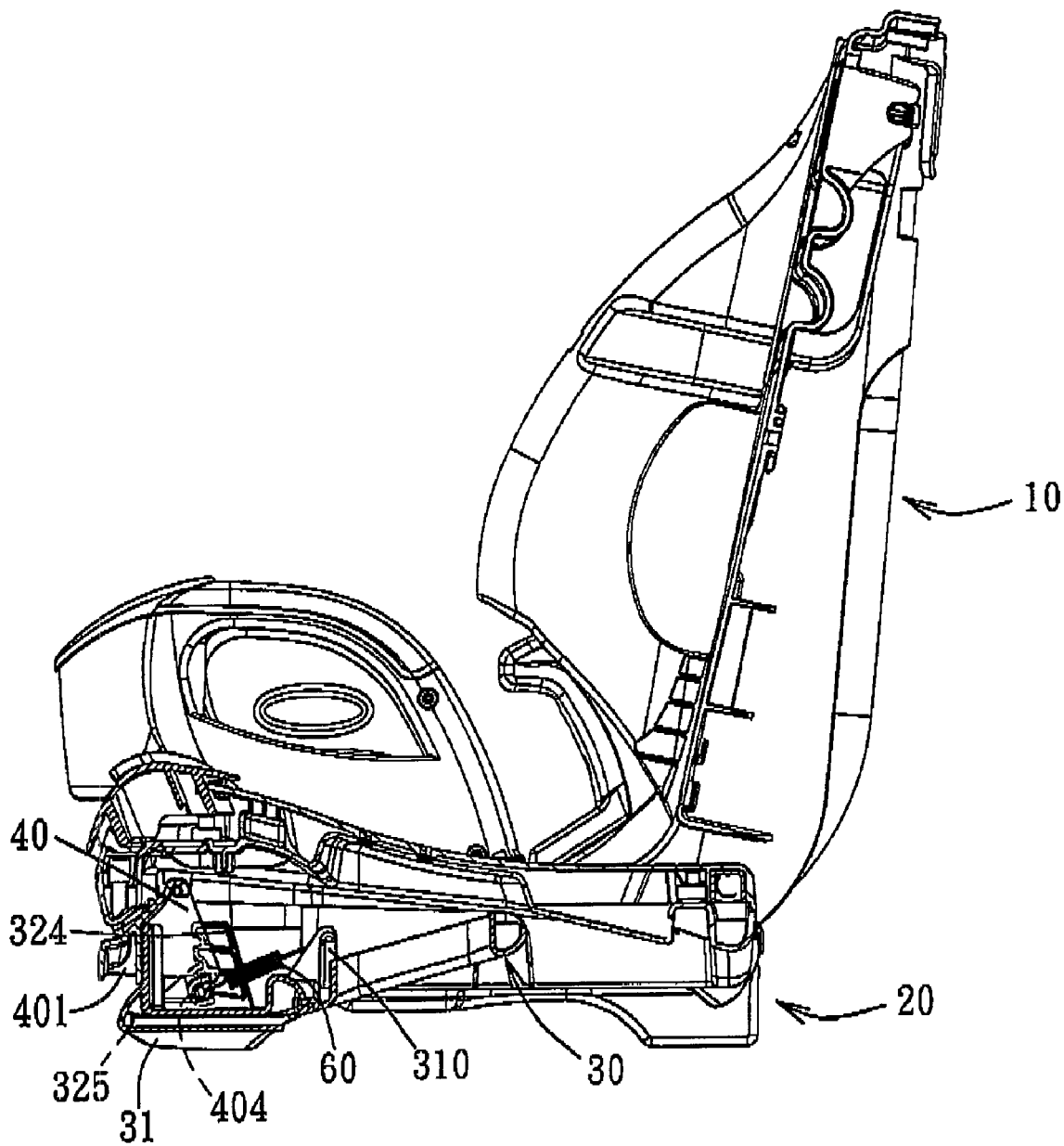
F I G. 6

CAR SEAT

CROSS-REFERENCE TO RELATED APPLICATION

This application claims priority of U.S. Provisional Application No. 61/075,337, filed on Jun. 25, 2008.

BACKGROUND OF THE INVENTION

1. Field of the Invention

The invention relates to a car seat, more particularly to a car seat that has different recline orientations and that is easy to operate.

2. Description of the Related Art

As shown in FIGS. 1 and 2, U.S. Pat. No. 7,059,677 B2 discloses a conventional car seat comprising a base unit 100. The base unit 100 includes a seat assembly 140, a base assembly 160 coupled pivotally to the seat assembly 140, and a positioning mechanism 300. The positioning mechanism 300 includes a positioning member 320 mounted on the base assembly 160, an actuator 340 mounted on the seat assembly 140, and a spring 360 disposed for biasing the actuator 340 toward the positioning member 320. The actuator 340 is formed with a handle 620 and a positioning arm 810 that is formed with a plurality of recesses. In use, a user pulls the handle 620 in a direction (P) (as indicated by the arrow in FIG. 1) so as to move the positioning arm 810 away from the positioning member 320 against the biasing action of the spring 360. As such, the seat assembly 140 is permitted to pivot about a pivot shaft 200 relative to the base assembly 160 under the manipulation of the user. Referring to FIG. 2, when the handle 620 is released, the positioning arm 810 is biased by the spring 360 to move toward the positioning member 320, such that the positioning member 320 engages a selected one of the recesses in the positioning arm 810, thereby maintaining the seat assembly 140 at a desired recline orientation relative to the base assembly 160. However, the above mentioned recline adjustment operation is relatively inconvenient to conduct.

SUMMARY OF THE INVENTION

Therefore, the object of the present invention is to provide a car seat that has different recline orientations and that is easy to operate.

Accordingly, a car seat of the present invention comprises a seat assembly, a base assembly disposed under and coupled pivotally to the seat assembly, and a positioning mechanism including a first positioning unit, a second positioning unit, and an elongated resilient component. The first positioning unit is mounted on the base assembly and is provided with a plurality of vertically spaced-apart first engaging members. The second positioning unit is coupled pivotally to the seat assembly, and is provided with a second engaging member engaging releasably a selected one of the first engaging members so as to lock releasably the base assembly at a desired angular position relative to the seat assembly. The resilient component has opposite first and second ends coupled pivotally and respectively to the base assembly and the second positioning unit, and is disposed for exerting a downward pulling force to the base assembly when the second engaging member is disengaged from the selected one of the first engaging members.

BRIEF DESCRIPTION OF THE DRAWINGS

Other features and advantages of the present invention will become apparent in the following detailed description of the preferred embodiment with reference to the accompanying drawings, of which:

FIG. 6 is a sectional view of the car seat of the preferred embodiment before recline adjustment;

DETAILED DESCRIPTION OF THE PREFERRED EMBODIMENT

Figure 1:
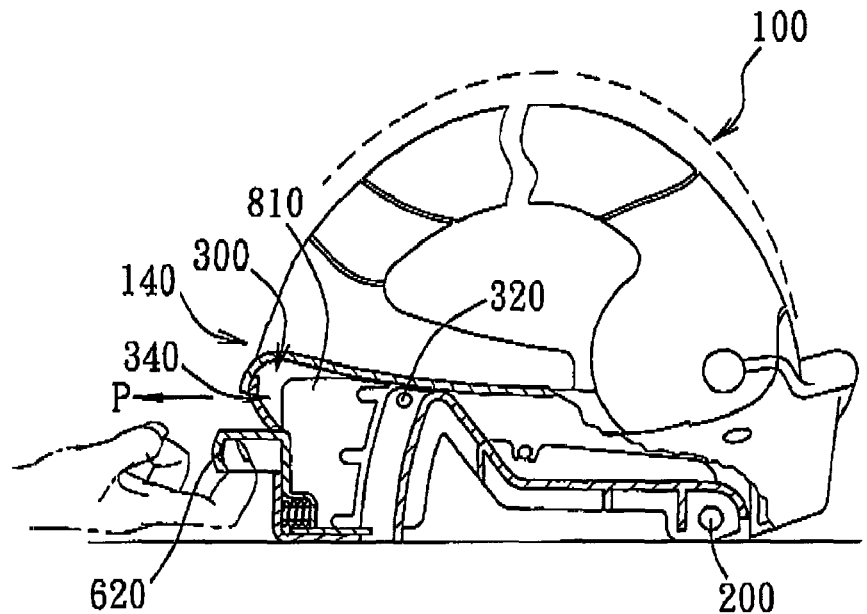
FIG. 1 is a fragmentary partly sectional view of a conventional car seat disclosed in U.S. Pat. No. 7,059,677 B2, illustrating a seat assembly at a zero-degree angular position relative to a base assembly.
Figure 2:
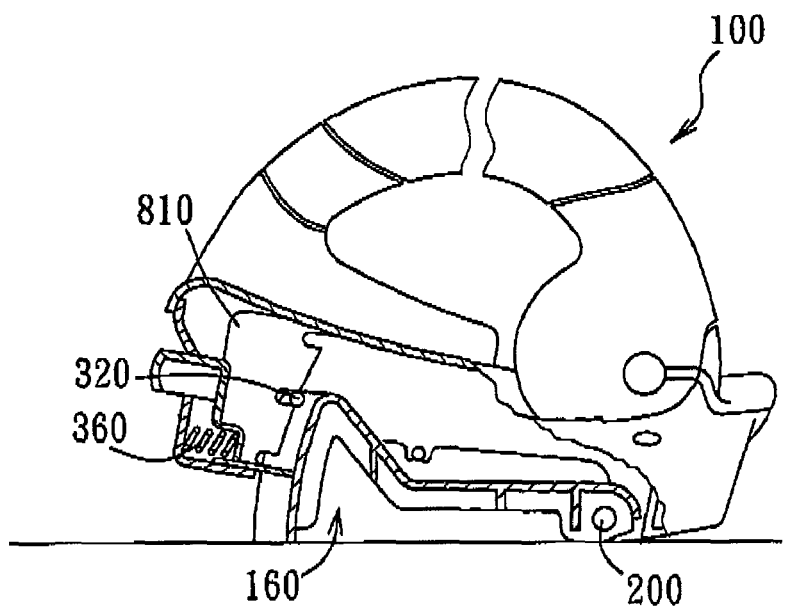
FIG. 2 is another fragmentary partly sectional view of the conventional car seat disclosed in U.S. Pat. No. 7,059,677 B2, illustrating the seat assembly at a desired angular position relative to the base assembly.
Figure 3:
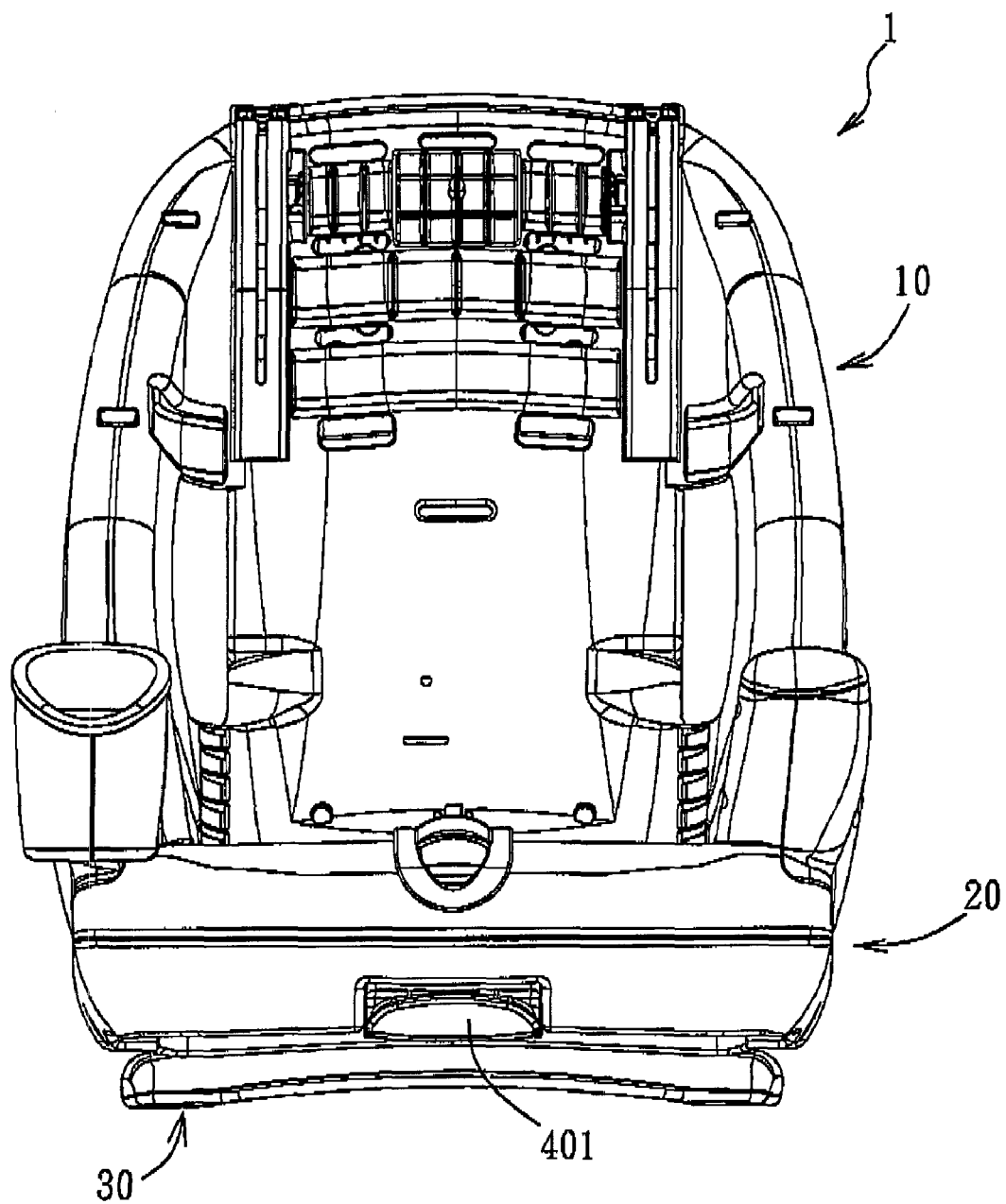
FIG. 3 is a front view of a preferred embodiment of a car seat according to the invention.
Figure 4:
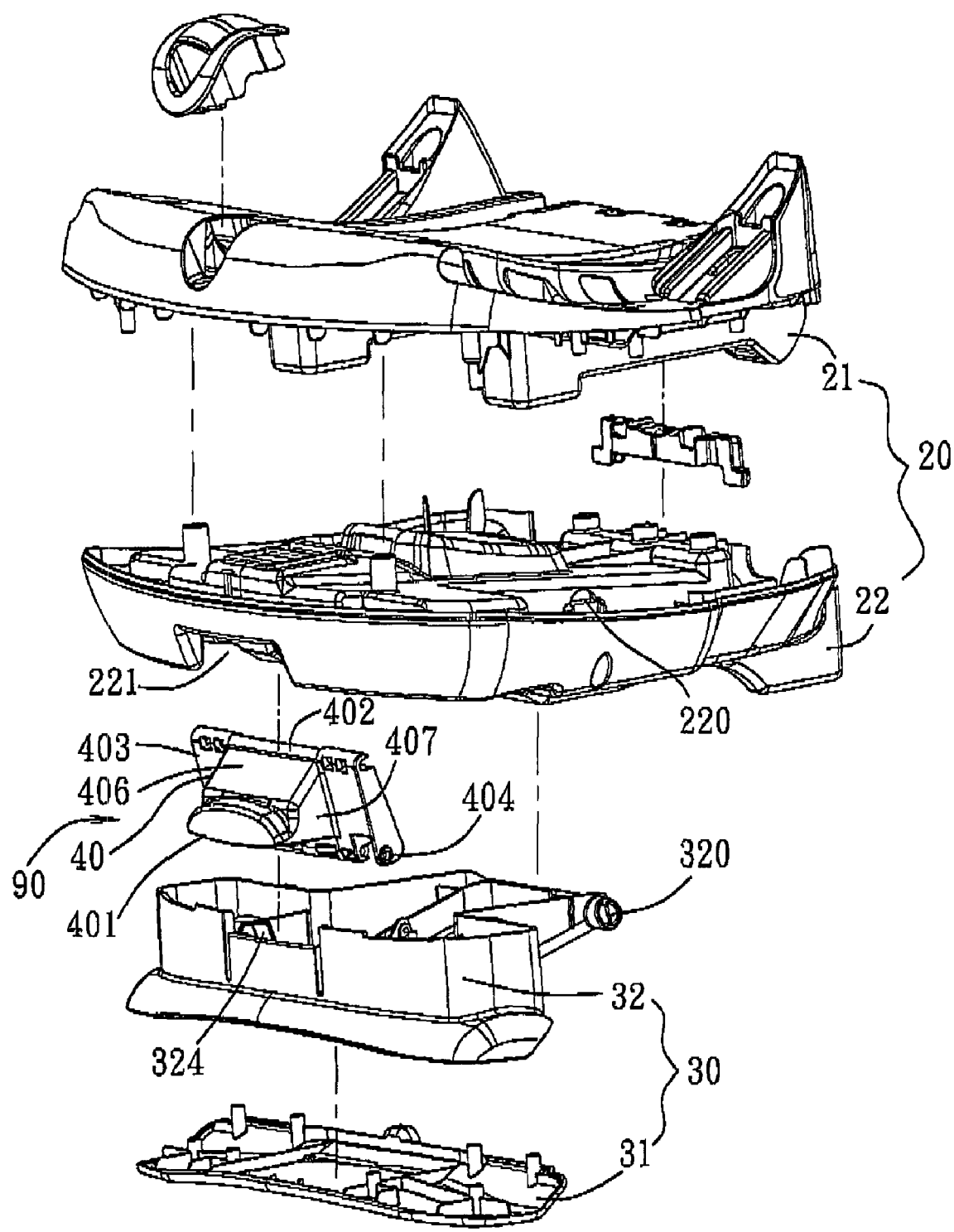
FIG. 4 is an exploded perspective view of a seat assembly and a base assembly of the preferred embodiment.

As shown in FIGS. 3 and 4, the preferred embodiment of a car seat 1 according to the present invention comprises a seat assembly 20, a base assembly 30, a backrest assembly 10 supported cooperatively by the seat assembly 20 and the base assembly 30, and a positioning mechanism 90.

The seat assembly 20 includes an upper seat part 21, and a lower seat part 22 coupled to the upper seat part 21. The lower seat part 22 has a middle portion formed with a pair of pivot holes 220 (only one is visible), and a front portion formed with a receiving groove 221.

The base assembly 30 includes a bottom plate 31 and a base body 32 disposed above and coupled to the bottom plate 31. The base body 32 has a rear end portion formed with a pair of pivot rods 320 that engage respectively and pivotally the pivot holes 220 in the lower seat part 22 of the seat assembly 20. The base assembly 30 further includes a connecting seat 310 (see FIG. 5) mounted on the base body 32.

Figure 5:
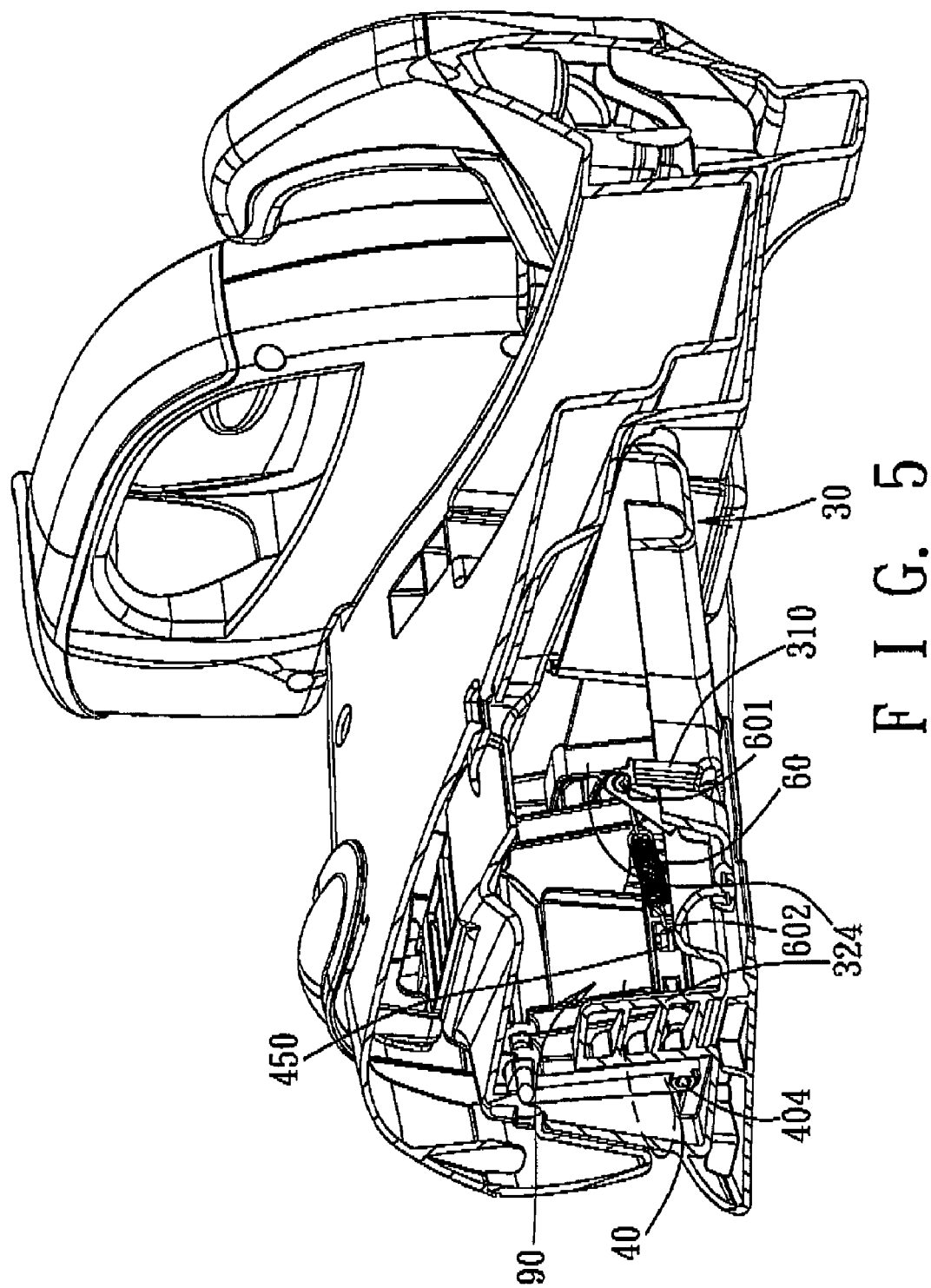
FIG. 5 is a perspective, partly cutaway view of the seat assembly and the base assembly of the preferred embodiment.

Referring to FIGS. 4 to 6, the positioning mechanism 90 includes a first positioning unit 324, a second positioning unit 40, and an elongated resilient component 60.

The first positioning unit 324 is mounted on the base body 32 of the base assembly 30 in front of the connecting seat 310, and is provided with a plurality of vertically spaced-apart first engaging members 325. In this embodiment, the first positioning unit 324 is configured as a pair of spaced-apart supporting frames, and the first engaging members 325 are configured as three pairs of recesses. In this embodiment, the recesses in each pair are formed respectively in front sides of the supporting frames.

The second positioning unit 40 is provided with a second engaging member 404. In this embodiment, the second positioning unit 40 is configured as a block having a main body 402, a handle 401, and a pair of extending walls 403. The main body 402 has a pair of spaced-apart side walls 407, and an oblique wall 406 extending obliquely and interconnecting top ends of the side walls 407. The handle 401 projects integrally from front ends of the oblique wall 406 and the side walls 407. The extending walls 403 extend respectively and perpendicularly from rear ends of the side walls 407. Each of the extending walls 403 has a top portion disposed under and coupled pivotally to the seat assembly 20. In this embodiment, the second positioning unit 40, i.e., the block, is disposed in the receiving groove 221 in the lower seat part 22 of the seat assembly 20 with the handle 401 projecting outwardly of the lower seat part 22. In this embodiment, the second engaging member 404 is configured as a pair of rails formed respectively at bottom ends of opposite lateral sides of the extending walls 403. The second positioning unit 40 further has a connecting rod 450 (see FIG. 5) disposed between and aligned with the rails (i.e., the second engaging member 404). In this embodiment, the base assembly 30 and the second positioning unit 40, i.e., the block, are made from injected molded plastic material, In this embodiment, the resilient component 60 is a tension spring having a first end 601 that is coupled pivotally to the connecting seat 310 of the base assembly 30, and a second end 602 that is opposite to the first end 601 and that is coupled pivotally to a middle portion of the connecting rod 450 of the second positioning unit 40. It should be noted that the second end 602 may be coupled pivotally to a bottom end of the main body 402 of the second positioning unit 40 in other embodiments of this invention. In this embodiment, the connecting seat 310 has a plurality of coupling positions, and the first end 601 of the resilient component 60 is coupled pivotally to a selected one of the coupling positions higher than the second end 602 of the resilient component 60.

Figure 7:
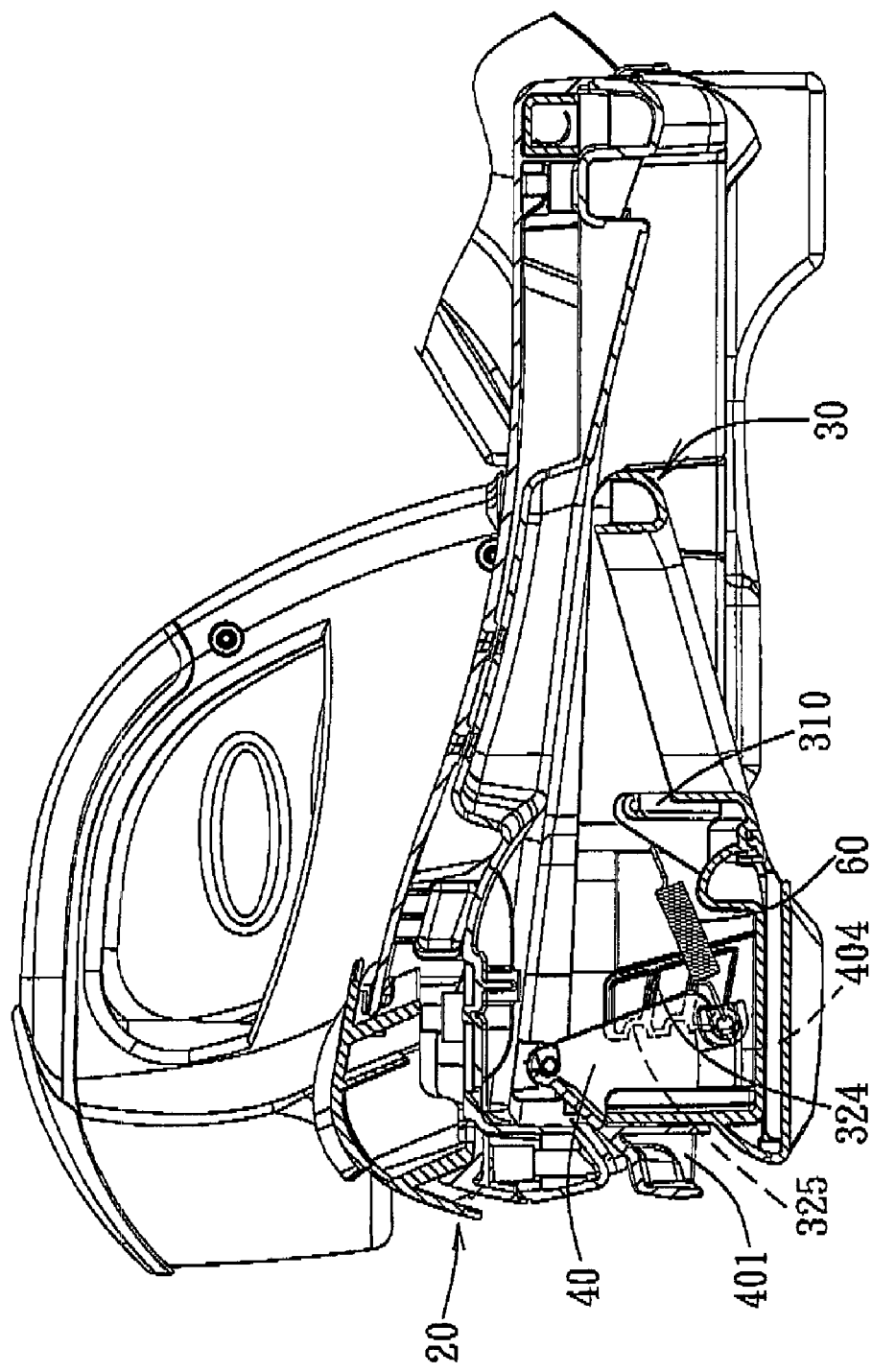
FIG. 7 is a fragmentary sectional view of the preferred embodiment, illustrating a first positioning unit engaging a second positioning unit.

Before recline adjustment, as shown in FIGS. 6 and 7, the seat assembly 20 is disposed at a normal position, where the second engaging member 404, i.e., the rails, engages the lowermost one of the first engaging members 325, i.e., the lowermost one pair of the recesses. At this time, an angle of the seat assembly 20 relative to the base assembly 30 is zero degree.

Figure 8:
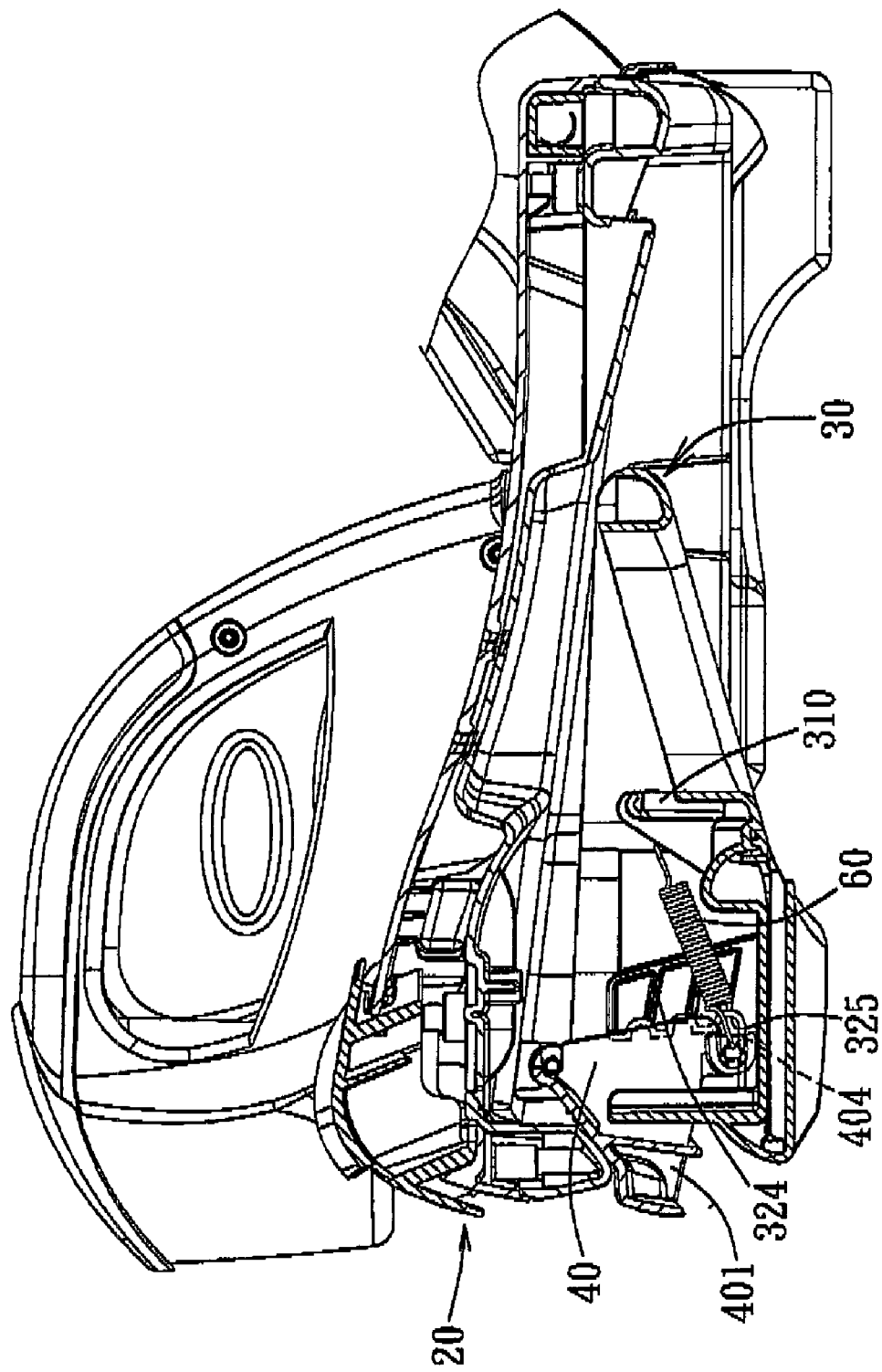
FIG. 8 is a view similar to FIG. 7, but illustrating the second positioning unit disengaged from the first positioning unit.
Figure 9:
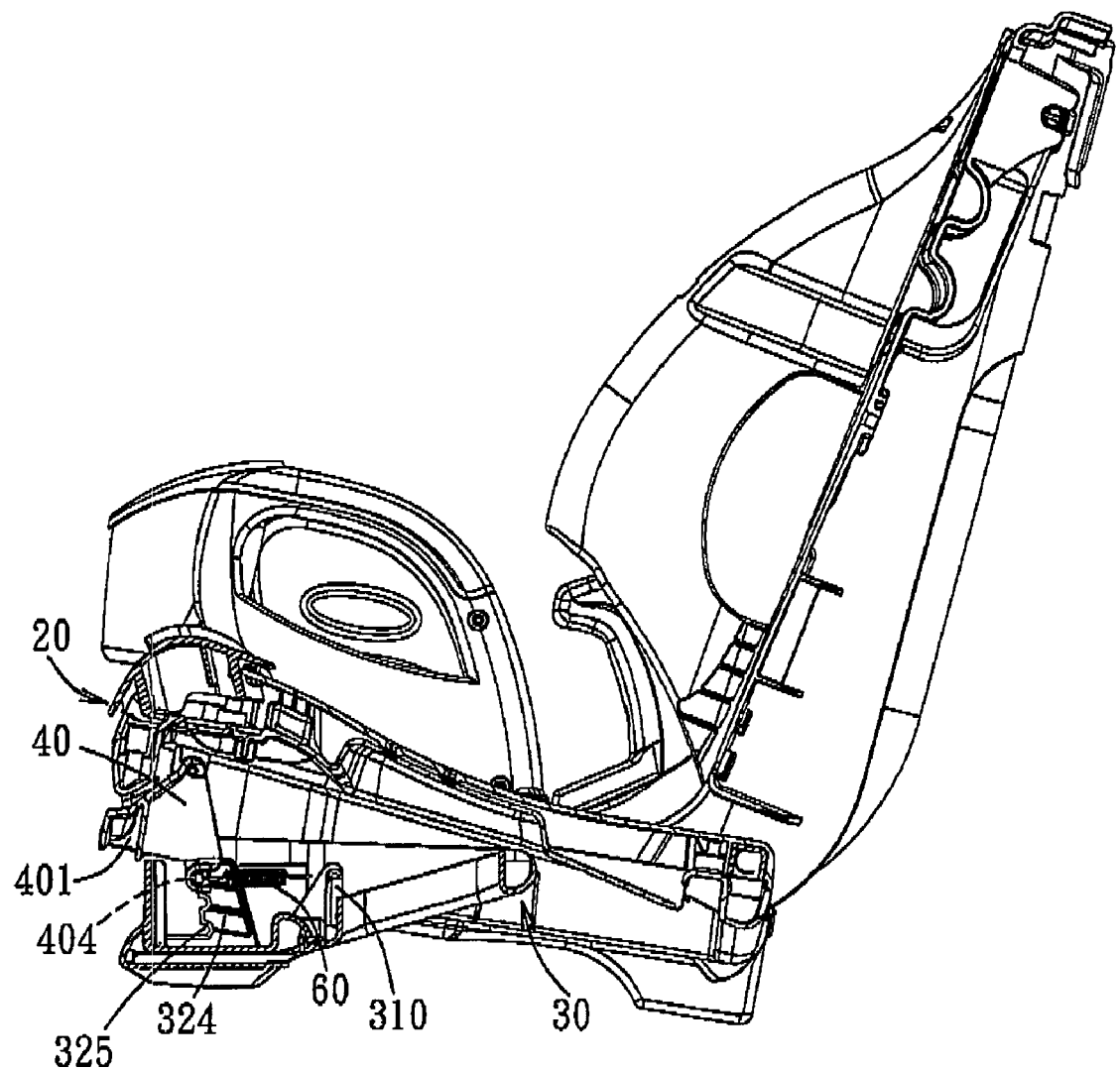
FIG. 9 is a view similar to FIG. 6, but illustrating the preferred embodiment after recline adjustment.

In use, the car seat 1 of the invention is adapted to be placed on a seat of an automobile (not shown). As shown in FIG. 8, when a user operates the handle 401, the second positioning unit 40 is driven to pivot relative to the seat assembly 20, such that the second engaging member 404 is disengaged from the lowermost one of the first engaging members 325. Meanwhile, the resilient component 60 is extended by virtue of the pivoting movement of the second positioning unit 40, thereby exerting a downward pulling force to the connecting seat 310 of the base assembly 30 to result in a downward pivoting movement of the base assembly 30 relative to the seat assembly 20. During the downward pivoting movement of the base assembly 30 relative to the seat assembly 20, a vertical distance between the height positions of the first and second ends 601, 602 of the resilient component 60 is gradually decreased, and the downward pulling force exerted to the base assembly 30 is decreased as well, thereby retarding the downward pivoting movement of the base assembly 30 relative to the seat assembly 20. Referring to FIG. 9, when the base assembly 30 is pivoted to a desired angular position relative to the seat assembly 20, the second engaging member 404 is automatically registered with a higher one of the first engaging members 325. Finally, when the handle 401 is released, the second engaging member 404 is biased by the resilient component 60 to engage releasably the higher one of the first engaging members 325 so as to lock releasably the base assembly 30 at the desired angular position relative to the seat assembly 20.

Figure 10:
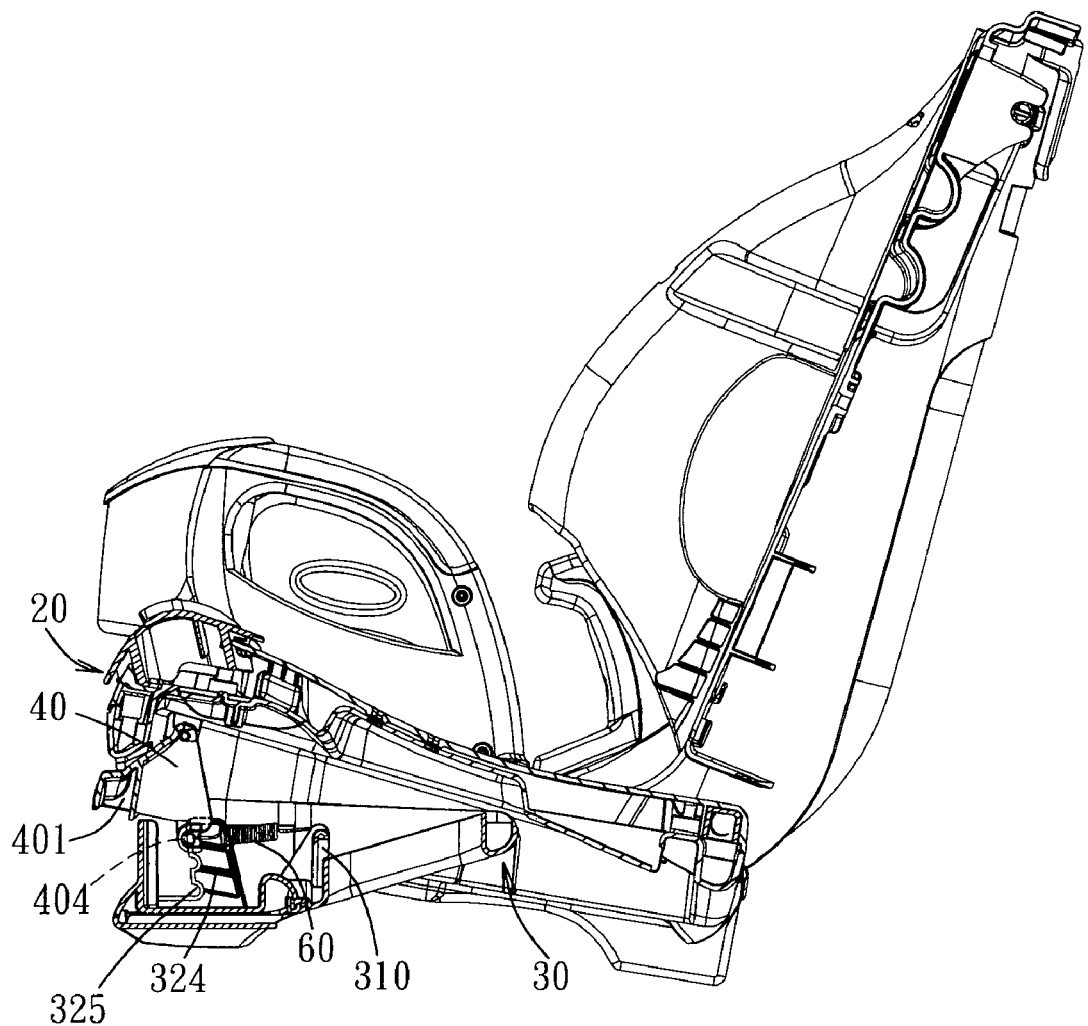
FIG. 10 is the same view as FIG. 9 but illustrating the first end of the resilient component being coupled pivotably to a higher coupling position of the connecting seat than that shown in FIG. 9.

FIG. 10 is the same as FIG. 9 but illustrates the first end 601 of the resilient component 60 being coupled pivotally to a higher coupling position of the connecting seat 310.

To operate the seat assembly 20 back to the normal position (i.e., to change the angular position of the base assembly 30 relative to the seat assembly 20), the user has to pull the handle 401 forwardly to disengage the second engaging member 404 from the selected one of the first engaging members 325, thereby permitting the seat assembly 20 to pivot downwardly by gravity relative to the base assembly 30 back to the normal position. Afterward, the handle 401 is released such that the second engaging member 404 is biased by the resilient component 60 to engage once again the lowermost one of the first engaging members 325, thereby locking the seat assembly 20 at the normal position. Since the resilient component 60 is extended when the second engaging member 404 is disengaged from the first engaging members 325, the resilient component 60 exerts a downward pulling force to the base assembly 30 during the downward pivoting movement of the seat assembly 20 for biasing the base assembly 30 to press against the car seat of the automobile, thereby facilitating the recline adjustment. Therefore, by simply controlling the handle 401, the user can operate the car seat 1 of this invention to complete the recline adjustment.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A car seat comprising a seat assembly, a base assembly disposed under and coupled pivotally to said seat assembly, and a positioning mechanism including:
   a first positioning unit that is mounted on said base assembly and that is provided with a plurality of vertically spaced-apart first engaging members;
   a second positioning unit that is coupled pivotally to said seat assembly, and that is provided with a second engaging member engaging releasably a selected one of said first engaging members so as to lock releasably said base assembly at a desired angular position relative to said seat assembly; and
   an elongated resilient component that has a first end coupled pivotally to said base assembly, and a second end opposite to said first end and coupled pivotally to said second positioning unit, and that is disposed for exerting a downward pulling force to said base assembly when said second engaging member is disengaged from the selected one of said first engaging members.

2. The car seat as claimed in claim 1, wherein said first end of said resilient component is at a height position higher than that of said second end thereof when an angle of said seat assembly relative to said base assembly is zero degree.

3. The car seat as claimed in claim 1, wherein said first end of said resilient component is at a height position higher than that of said second end thereof when said second engaging member engages one of said first engaging members.

4. The car seat as claimed in claim 1, wherein said second positioning unit is pivotable relative to said seat assembly so as to disengage said second engaging member from the selected one of said first engaging members.

5. The car seat as claimed in claim 1, wherein said resilient component is a tension spring.

6. The car seat as claimed in claim 1, wherein said base assembly has a rear end portion coupled pivotally to a middle portion of said seat assembly.

7. The car seat as claimed in claim 1, further comprising a backrest unit supported cooperatively by said seat assembly and said base assembly.

8. The car seat as claimed in claim 7, wherein said base assembly has a rear end portion coupled pivotally to a middle portion of said seat assembly.

9. The car seat as claimed in claim 1, wherein said first positioning unit is configured as a supporting frame, and said first engaging members are configured as a plurality of recesses formed in said supporting frame; and said second positioning unit is configured as a block, and said second engaging member is configured as a rail engaging the selected one of said recesses.

10. The car seat as claimed in claim 9, wherein said second positioning unit is pivotable relative to said first positioning unit.

11. The car seat as claimed in claim 1, wherein said first positioning unit is configured as a pair of spaced-apart supporting frames, and each of said first engaging members is configured as a pair of recesses formed respectively in said supporting frames; and said second positioning unit is configured as a block, and said second engaging member is configured as a pair of rails engaging respectively a selected pair of said recesses.

12. The car seat as claimed in claim 11, wherein said second positioning unit is pivotable relative to said first positioning unit, and said rails are formed respectively at opposite lateral sides of said second positioning unit.

13. The car seat as claimed in claim 1, wherein said second positioning unit is configured as a block, said block being formed integrally with a handle that projects from a front end of said block and outwardly of said seat assembly.

14. A car seat comprising a seat assembly, a base assembly disposed under and coupled pivotally to said seat assembly, and a positioning mechanism including:
   a first positioning unit that is mounted on said base assembly and that is provided with a plurality of vertically spaced-apart first engaging members;
   a second positioning unit that is coupled pivotally to said seat assembly, and that is provided with a second engaging member engaging releasably a selected one of said first engaging members so as to lock releasably said base assembly at a desired angular position relative to said seat assembly;
   an elongated resilient component that has a first end coupled pivotally to said base assembly, and a second end opposite to said first end and coupled pivotally to said second positioning unit, and that is disposed for exerting a downward pulling force to said base assembly when said second engaging member is disengaged from the selected one of said first engaging members, said base assembly including a connecting seat having a plurality of coupling positions, said first end of said resilient component being coupled pivotally to a selected one of said coupling positions.

* * * * *